United States Patent
Toshioka et al.

(10) Patent No.: US 8,307,635 B2
(45) Date of Patent: Nov. 13, 2012

(54) EXHAUST PURIFICATION SYSTEM OF INTERNAL COMBUSTION ENGINE

(75) Inventors: Shunsuke Toshioka, Susono (JP); Tomihisa Oda, Numazu (JP); Masaaki Sato, Susono (JP); Shinya Asaura, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 292 days.

(21) Appl. No.: 12/673,950

(22) PCT Filed: May 7, 2009

(86) PCT No.: PCT/JP2009/058952
§ 371 (c)(1),
(2), (4) Date: Feb. 17, 2010

(87) PCT Pub. No.: WO2010/128563
PCT Pub. Date: Nov. 11, 2010

(65) Prior Publication Data
US 2011/0047993 A1    Mar. 3, 2011

(51) Int. Cl.
*F01N 3/10*    (2006.01)
(52) U.S. Cl. ........... 60/286; 60/285; 60/295; 60/301
(58) Field of Classification Search .......... 60/285, 60/295, 301, 286
See application file for complete search history.

(56) References Cited

U.S. PATENT DOCUMENTS

| | | | |
|---|---|---|---|
| 5,785,937 A * | 7/1998 | Neufert et al. | 423/213.2 |
| 6,119,448 A * | 9/2000 | Emmerling et al. | 60/274 |
| 6,269,633 B1 * | 8/2001 | van Nieuwstadt et al. | 60/277 |
| 2002/0069642 A1 * | 6/2002 | Dolling et al. | 60/286 |
| 2003/0182935 A1 | 10/2003 | Kawai et al. | |

FOREIGN PATENT DOCUMENTS

| JP | A 2000-110631 | 4/2000 |
|---|---|---|
| JP | A 2003-293737 | 10/2003 |
| JP | A 2005-201218 | 7/2005 |
| JP | A 2008-261253 | 10/2008 |

OTHER PUBLICATIONS

International Search Report issued for International Application No. PCT/JP2009/058952 on Aug. 11, 2009 (with translation).

* cited by examiner

*Primary Examiner* — Binh Q Tran
*Assistant Examiner* — Brandon Lee
(74) *Attorney, Agent, or Firm* — Oliff & Berridge, PLC

(57) ABSTRACT

An exhaust purification system of an internal combustion engine that includes a $NO_x$ catalyst device which has a reducing material holding ability for holding reducing material and can reduce $NO_x$ by using the reducing material; and an electronic control unit that includes program logic, which when executed, determines whether or not a difference between a target amount of reducing material held by the $NO_x$ catalyst device and a current amount of reducing material held by the $NO_x$ catalyst device is larger than a set amount; and performs a first control or a second control.

8 Claims, 3 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

In an exhaust system of an internal combustion engine which performs lean combustion, such as in a diesel engine, a $NO_X$ catalyst device is arranged to purify $NO_X$ in the exhaust gas. One known $NO_X$ catalyst device produces ammonia by hydrolysis of urea supplied with the exhaust gas and selectively reduces $NO_X$ in the exhaust gas by using of ammonia $NH_3$ as a reducing material.

An amount of urea per a unit time just sufficient to reduce an amount of $NO_X$ per a unit time flowing into such a selectively reduction type $NO_X$ catalyst device indicates "an amount of urea of an equivalence ratio of 1", and it is desirable that an amount of urea of the equivalence ratio of 1 is always supplied into the $NO_X$ catalyst device. However, when an amount of $NO_X$ per a unit time flowing into the $NO_X$ catalyst device changes by a change of the engine operation, it is difficult that an amount of urea of the equivalence ratio of 1 is supplied to the $NO_X$ catalyst device to follow the change of an amount of $NO_X$ per a unit time flowing into the $NO_X$ catalyst device.

Accordingly, an exhaust purification system of an internal combustion engine comprising the selectively reducing type $NO_X$ catalyst device is known, in which urea holding ability is provided to hold a certain amount of urea. When an amount of $NO_X$ per a unit time flowing into the $NO_X$ catalyst device increases to follow a change of the engine operation, even if an amount of urea of the equivalence ratio under 1 is supplied, it is intended that ammonia can be produced from the held urea so as to compensate for a shortage in ammonia, such that $NO_X$, in the exhaust gas can be satisfactorily reduced. On the other hand, when an amount of $NO_X$ per a unit time flowing into the $NO_X$ catalyst device decreases to follow a change of the engine operation, even if an amount of urea of the equivalence ratio over 1 is supplied, it is intended that extra urea can be held by the urea holding ability to restrain the ammonia flowing out.

In the above exhaust purification system, the amount of urea that can be held by the urea holding ability changes according to the temperature of the $NO_X$ catalyst device. Accordingly, it is suggested that a target amount of held urea is set for each temperature of the $NO_X$ catalyst device and to realize the target amount of held urea for each temperature of the $NO_X$ catalyst device, urea supplying is stopped when it is estimated that an amount of urea held in the $NO_X$ catalyst device is larger than the target amount of held urea and an amount of urea of the equivalence ratio over 1 is supplied when it is estimated that an amount of urea held in the $NO_X$ catalyst device is smaller than the target amount of held urea (for example, refer to Japanese Unexamined Patent Publication Nos. 2003-293737 and 2005-201218).

DISCLOSURE OF THE INVENTION

In the above exhaust purification system of an internal combustion engine, even if a high $NO_X$ purification rate is required, urea supplying is stopped when it is estimated that an amount of urea held in the $NO_X$ catalyst device is larger than the target amount of held urea. Therefore, $NO_X$ is reduced only by ammonia produced from the held urea and thus a high $NO_X$ purification rate may not be realized.

Accordingly, an object of the present invention is to provide an exhaust purification system of an internal combustion engine, comprising a $NO_X$ catalyst device which has a reducing material holding ability for holding reducing material and can reduces $NO_X$ by reducing material, in which when a high $NO_X$ purification rate is required, the high purification rate can be realized.

An exhaust purification system of an internal combustion engine as set forth in claim 1 of the present invention, comprising a $NO_X$ catalyst device which has a reducing material holding ability for holding reducing material and can reduce $NO_X$ by using of reducing material, is provided, characterized in that a first control, in which an amount of reducing material of the equivalence ratio over 1 for an amount of $NO_X$ in the exhaust gas flowing into the $NO_X$ catalyst device is supplied to the $NO_X$ catalyst device until the reducing material holding ability holds a preset target amount of reducing material, is carried out and a second control, in which in spite of an amount of reducing material held by the reducing material holding ability, an amount of reducing material of the equivalence ratio of a predetermined value for an amount of $NO_X$ in the exhaust gas flowing into the $NO_X$ catalyst device is supplied to the $NO_X$ catalyst device, is carried out from when the first control has been carried out to when the next first control will be carried out.

An exhaust purification system of an internal combustion engine as set forth in claim 2 of the present invention is provided as the exhaust purification system of an internal combustion engine as set forth in claim 1 characterized in that the value in the second control is predetermined for each engine operation.

An exhaust purification system of an internal combustion engine as set forth in claim 3 of the present invention is provided as the exhaust purification system of an internal combustion engine as set forth in claim 1 or 2 characterized in that the target amount of reducing material in the first control is preset for each temperature of the $NO_X$ catalyst device.

An exhaust purification system of an internal combustion engine as set forth in claim 4 of the present invention is provided as the exhaust purification system of an internal combustion engine as set forth in claim 3 characterized in that the first control is carried out when a difference between the target amount of reducing material for the current temperature of the $NO_X$ catalyst device and a current amount of reducing material held by the reducing material holding ability is larger than a predetermined amount.

An exhaust purification system of an internal combustion engine as set forth in claim 5 of the present invention is provided as the exhaust purification system of an internal combustion engine as set forth in any one of claims 1-4 characterized in that the first control is carried out every engine starting time.

According to the exhaust purification system of an internal combustion engine as set forth in claim 1 of the present invention, a first control, in which an amount of reducing material of the equivalence ratio over 1 for an amount of $NO_X$ in the exhaust gas flowing into the $NO_X$ catalyst device is supplied to the $NO_X$ catalyst device until the reducing material holding ability holds a preset target amount of reducing material, is carried out and a second control, in which in spite of an amount of reducing material held by the reducing material holding ability, an amount of reducing material of the equivalence ratio of a predetermined value for an amount of $NO_X$ in the exhaust gas flowing into the $NO_X$ catalyst device is supplied to the $NO_X$ catalyst device, is carried out from when the first control has been carried out to when the next first control will be carried out. Accordingly, during the second control, when a high $NO_X$ purification rate is required, even if the reducing material holding ability holds an amount of reducing material larger than the target amount of reducing material, reducing material supply is not stopped, and thus a $NO_X$ purification rate does not drop. In the $NO_X$ catalyst device, a part of reducing material held by the reducing material holding ability is released and an amount of reducing material of the equivalence ratio of the predetermined value is supplied to the $NO_X$ catalyst device by the second control, so that a high $NO_X$ purification rate can be realized by a large amount of reducing material.

According to the exhaust purification system of the internal combustion engine as set forth in claim 2 of the present invention, in the exhaust purification system of an internal combustion engine as set forth in claim 1, the value in the second control is predetermined for each engine operation. Therefore, during the second control, an amount of reducing material of the equivalence ratio of the value suitable for each engine operation can be supplied.

According to the exhaust purification system of an internal combustion engine as set forth in claim 3 of the present invention, in the exhaust purification system of an internal combustion engine as set forth in claim 1 or 2, the target amount of reducing material in the first control is preset for each temperature of the $NO_X$ catalyst device. Therefore, the reducing material holding ability can hold the target amount of reducing material preset for each temperature of the $NO_X$ catalyst device by the first control.

According to the exhaust purification system of an internal combustion engine as set forth in claim 4 of the present invention, in the exhaust purification system of an internal combustion engine as set forth in claim 3, the first control is carried out when a difference between the target amount of reducing material for the current temperature of the $NO_X$ catalyst device and a current amount of reducing material held by the reducing material holding ability is larger than a predetermined amount. Therefore, the difference between the target amount of reducing material for the current temperature of the $NO_X$ catalyst device and the current amount of reducing material held by the reducing material holding ability is not maintained larger than the predetermined amount. Thus, during the second control, it can be restrained that in the $NO_X$ catalyst device, reducing material held by the reducing material holding ability is insufficiently released so that the $NO_X$ purification rate drops.

According to the exhaust purification system of an internal combustion engine as set forth in claim 5 of the present invention, in the exhaust purification system of an internal combustion engine as set forth in any one of claims 1-4, the first control is carried out at every engine starting. Therefore, the reducing material holding ability holds the target amount of reducing material at every engine starting by the first control. Accordingly, during the second control, it can be restrained that in the $NO_X$ catalyst device, reducing material held by the reducing material holding ability is insufficiently released so that the $NO_X$ purification rate drops.

BEST MODE FOR CARRYING OUT THE INVENTION

Figure 1:
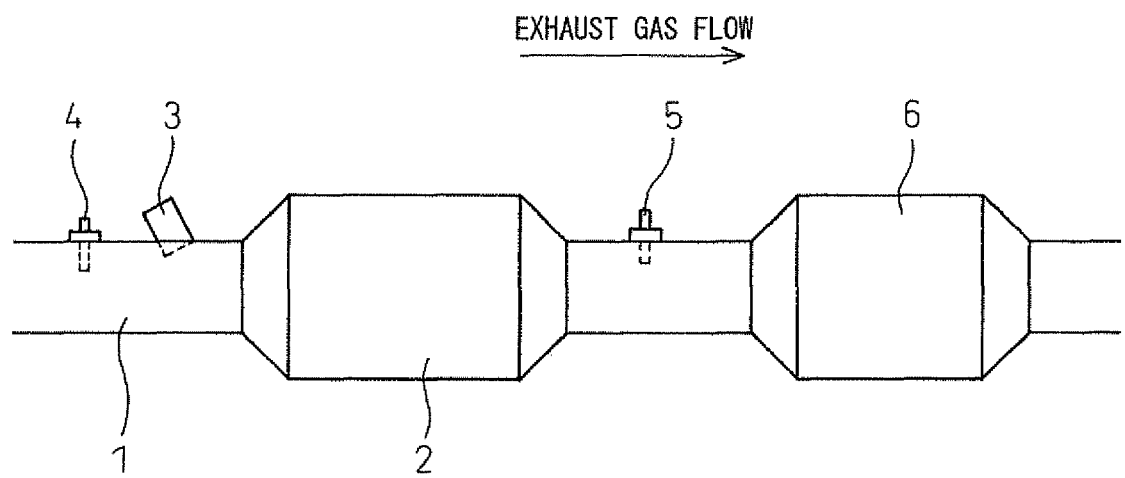
FIG. 1 is a schematic view showing an embodiment of the exhaust purification system of an internal combustion engine according to the present invention.

FIG. 1 is a schematic view showing an embodiment of the exhaust purification system of an internal combustion engine according to the present invention. In FIG. 1, reference numeral 1 is a diesel engine or a direct fuel injection-type spark-ignition engine which performs lean combustion. The exhaust gas of the engine 1 which performs lean combustion includes a relatively large amount of $NO_X$ so that a $NO_X$ catalyst device 2 for purifying $NO_X$ is arranged in the exhaust passage 1. The $NO_X$ catalyst device 2 is a selectively reducing type $NO_X$ catalyst device which comprises for example a carrier made of titania carrying vanadium oxide or a carrier made of zeolite carrying copper.

In the selectively reducing type $NO_X$ catalyst device 2, when reducing material for example water solution of urea is supplied to the exhaust gas including excessive oxygen, $NO_X$ included in the exhaust gas is reduced on the catalyst, such as vanadium oxide, copper, or the like by ammonia $NH_3$ as reducing material, produced from urea $CO(NH_2)_2$ (for example, $2NH_3+2NO+½O_2 \rightarrow 2N_2+3H_2O$).

In this case, an amount of urea per a unit time just enough to reduce an amount of $NO_X$ per a unit time flowing into the selectively reduction type $NO_X$ catalyst device 2 is an amount of urea of the equivalence ratio of 1.

In FIG. 1, reference numeral 3 is a urea supplying device for supplying water solution of urea to the $NO_X$ catalyst device 2. Reference numeral 4 is an upstream side $NO_X$ sensor to detect a concentration of $NO_X$ of the exhaust gas flowing into the $NO_X$ catalyst device 2. Reference numeral 5 is a downstream side $NO_X$ sensor to detect a concentration of $NO_X$ of the exhaust gas flowing out from the $NO_X$ catalyst device 2. For example, a ratio of the concentration of $NO_X$ detected by the downstream side $NO_X$ sensor 5 to the concentration of $NO_X$ detected by the upstream side $NO_X$ sensor 4 shows a $NO_X$ purification rate. Reference numeral 6 is an oxidation catalyst device carrying for example noble metal catalyst to oxidize ammonia flowing out from the $NO_X$ catalyst device 2 to $N_2$ or $NO_X$.

Incidentally, the carrier made of titanic, zeolite, or the like of the $NO_X$ catalyst device 2 can hold extra urea. Thus, if the $NO_X$ catalyst device 2 has a urea holding ability (reducing material holding ability) so as to hold the extra urea, $NH_3$ is not produced only from the supplied urea but also from the held urea so as to generally distribute within the $NO_X$ catalyst device 2. Therefore, $NO_X$ in the exhaust gas can be satisfactorily reduced and the $NO_X$ reducing rate can be higher than that in case that $NO_X$ is reduced by $NH_3$ produced only from the supplied urea.

Figure 2:
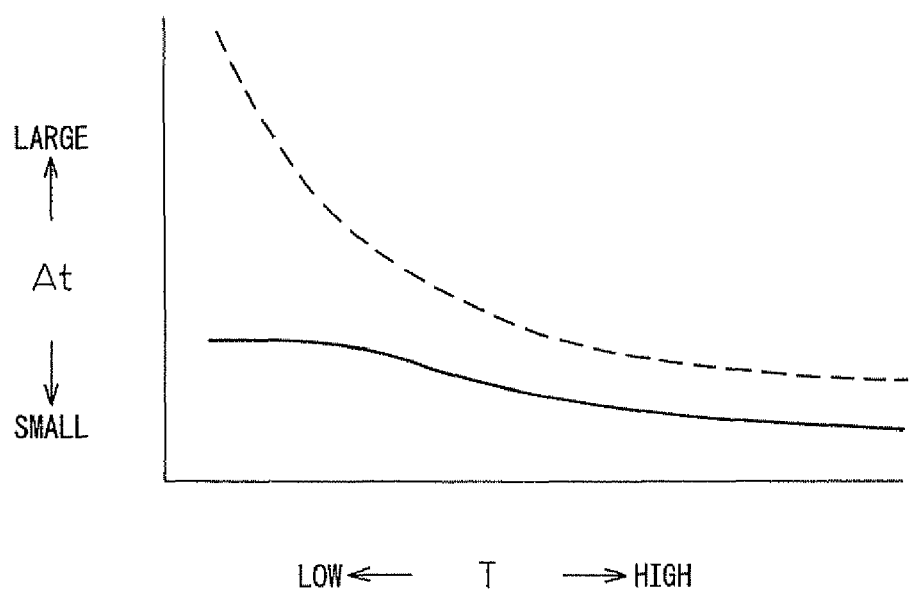
FIG. 2 is a graph slowing a relationship between the temperature of the $NO_X$ catalyst device and a target amount of urea held by the urea holding ability.

A dotted line in FIG. 2 shows a relationship between a temperature (T) of the $NO_X$ catalyst device 2 and an amount of urea that can be held in the $NO_X$ catalyst device 2. The lower the temperature (T) of the $NO_X$ catalyst device 2 is, the larger an amount of urea can be held in the $NO_X$ catalyst device. On the other hand, a solid line in FIG. 2 is a graph showing each target amount of urea (At) held in the $NO_X$ catalyst device 2 for each temperature (T) thereof, which is set so as not to exceed each amount of urea that can be held therein (the dotted line) and such that there is some difference between each amount of urea that can be held and each target amount of held urea.

Thus, when the target amount of urea (At) is held in the $NO_X$ catalyst device 2, $NO_X$ can be satisfactorily reduced by using of $NH_3$ produced by the held urea and $NH_3$ produced by the supplied urea. Furthermore, when an amount of urea of the equivalence ratio over 1 is supplied to the $NO_X$ catalyst device 2, the extra urea can be held therein and $NH_3$ does not immediately flow out therefrom.

However, if an amount of urea supplied to the $NO_X$ catalyst device 2 is control such that the $NO_X$ catalyst device 2 always holds the target amount of urea (At), when it is estimated that the current amount of urea held in the $NO_X$ catalyst device 2 exceeds the current target amount of urea (At), the urea supplying is stopped. Thus, $NO_X$ in the exhaust gas is reduced only by $NH_3$ produced by the held urea and the $NO_X$ purification rate is dropped because $NH_3$ does not generally distribute within the $NO_X$ catalyst device 2.

Furthermore, if an amount of urea supplied to the $NO_X$ catalyst device 2 is control such that the $NO_X$ catalyst device 2 holds the target amount of urea (At), the supplied urea is not always held to generally distribute within the $NO_X$ catalyst device 2. Therefore, if the target amount of urea (At) is locally held in the $NO_X$ catalyst device 2, $NH_3$ may flow out therefrom.

Figure 3:
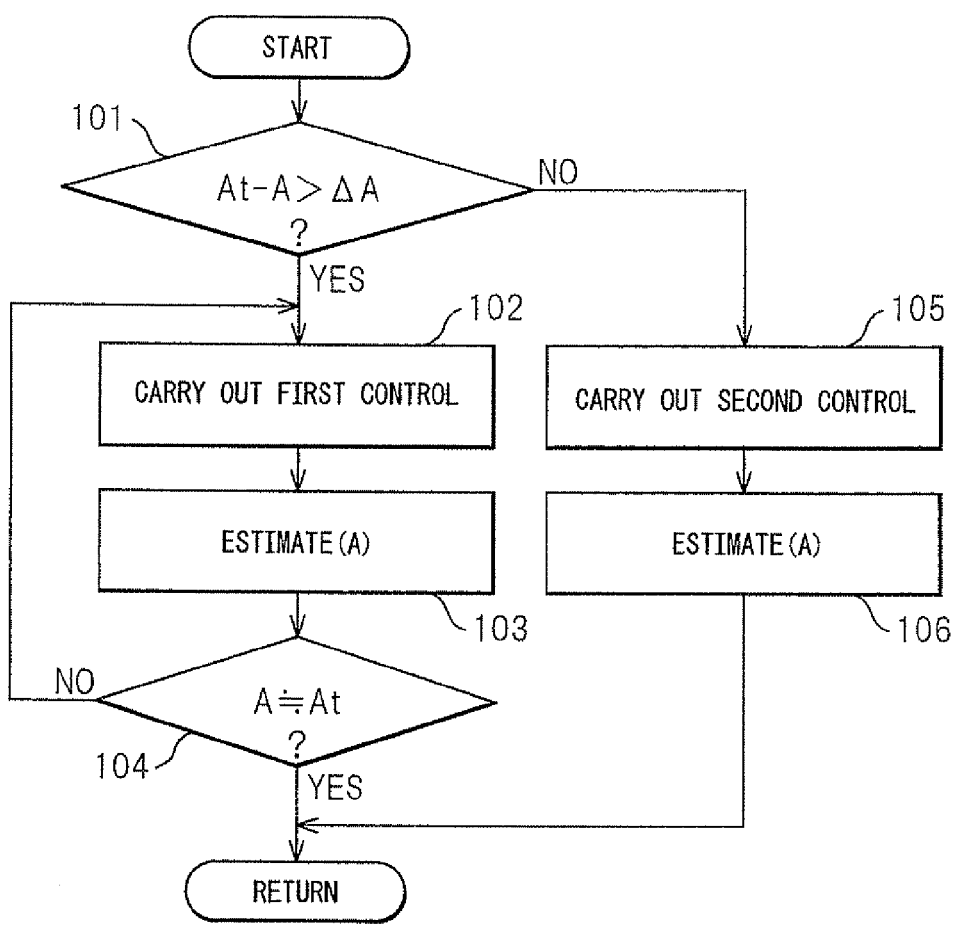
FIG. 3 is a flow chart showing a urea supplying control carried out in the exhaust purification system of the present invention.

The exhaust purification system for an internal combustion engine according to the present invention carries out a urea supplying control on the basis of a flow chart shown in FIG. 3. First, at step 101, it is determined if a difference between a target amount of urea (At) for a current temperature (T) of the $NO_X$ catalyst device 2 and a current amount of urea (A) held in the $NO_X$ catalyst device 2 is larger than a set amount ($\Delta A$).

An amount of urea that is newly held in the $NO_X$ catalyst device at this time within an amount of urea that is newly supplied thereto at this time and an amount of urea that is newly released as ammonia at this time from the amount of urea held in the $NO_X$ catalyst device at the last time are estimated on the basis of a current concentration of $NO_X$ in the exhaust gas, the equivalence ratio of the urea supplying at this time, a current amount of exhaust gas per a unit time, a current temperature (T) of the $NO_X$ catalyst device 2 and the like. The estimated amount of urea that is newly held is added to the amount of held urea at the last time and the estimated amount of urea that is newly released is subtracted from the amount of held urea at the last time. As a result, a current amount of held urea can be estimated. The higher a temperature (T) of the $NO_X$ catalyst device 2 is, the larger an amount of urea released as ammonia is.

When the result at step 101 is positive, i.e., when the current amount of held urea (A) is significantly smaller than the target amount of held urea (At) for the current temperature (T) of the $NO_X$ catalyst device 2, a first control is carried out at step 102. In the first control, an amount of water solution of urea of the equivalence ratio over 1, for example 2, is supplied to the $NO_X$ catalyst device 2 by the urea supplying device 3. Next, at step 103, an amount of held urea (A) after urea supplying of the first control at this time is estimated. At step 104, it is determined if the estimated amount of held urea (A) reaches the target amount of held urea (At) for the current temperature (T) of the $NO_X$ catalyst device 2. When the result at step 104 is negative, the processes of steps 102 and 103 are repeated so that urea is supplied to the $NO_X$ catalyst device 2 by the first control.

When the amount of held urea (A) reaches the target amount of held urea (At) for the current temperature (T) of the $NO_X$ catalyst device 2, the result at step 104 is positive and the routine returns to step 101. At present, because the amount of held urea (A) reaches the target amount of held urea (At) for the current temperature (T) of the $NO_X$ catalyst device 2, the result at step 101 is negative and a second control is carried out at step 105. In the second control, an amount of water solution of urea of the equivalence ratio of a value suitable for the current engine operation is supplied to the $NO_X$ catalyst device 2 by the urea supplying device 3.

For example, when a high $NO_X$ purification rate is required because the $NO_X$ concentration of the exhaust gas is high, an amount of urea of the equivalence ratio over 1 is supplied. For example, when it is required to restrain the ammonia discharge because the vehicle is stopped, an amount of urea of the equivalence ratio under 1 is supplied. In normal engine operation, an amount of urea of the equivalence ratio of 1 is supplied. In addition, in the second control, an amount of urea of the equivalence ratio over 1 may be always supplied.

Next, at step 106, an amount of held urea (A) after urea supplying of the second control at this time is estimated and the routine returns to step 101. The processes of steps 105 and 106 are repeated until the result at step 101 is positive so that urea is supplied to the $NO_X$ catalyst device 2 by the second control.

Figure 4:
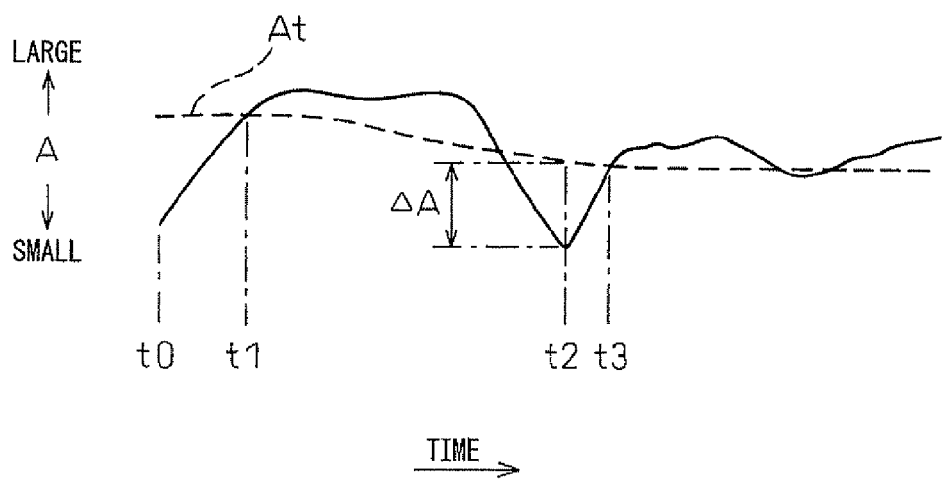
FIG. 4 is a time chart showing a change of an amount of urea held in the $NO_X$ catalyst device according to the urea supplying control in FIG. 3.

A solid line in FIG. 4 is a time chart showing a change of an amount of held urea (A) according to the urea supplying control of the flow chart in FIG. 3. A dotted line in FIG. 4 shows a change of a target amount of held urea (At) according to the temperature (T) of the $NO_X$ catalyst device 2. At a time (t0), the engine is started. A temperature (T) of the $NO_X$ catalyst device 2 when the engine is started is lower than that when the engine is stopped and thus the target amount of held urea when the engine is started is larger than that when the engine is stopped. Accordingly, in many cases when the engine is started, a difference between the target amount of held urea (At) for the current temperature of the $NO_X$ catalyst device 2 and the current amount of urea (A) held in the $NO_X$ catalyst device 2 is larger than the set amount ($\Delta A$). Therefore, the first control is carried out so that an amount of water solution of urea of the equivalence ratio over 1, for example 2 is supplied to the $NO_X$ catalyst device 2 by the urea supplying device 3. Thus, at a time (t1), the amount of held urea (A) reaches the target amount of held urea (At) at the time (t1).

Therefore, the second control is carried out from the time (t1) so that an amount of water solution of urea of the equivalence ratio of a value suitable for the engine operation at each time is supplied to the $NO_X$ catalyst device 2 by the urea supplying device 3. For example, immediately after the time (t1), an amount of urea of the equivalence ratio over 1 (for example 1.3) is supplied so that $NO_X$ in the exhaust gas is satisfactorily reduced by using of $NH_3$ produced from the urea held in the $NO_X$ catalyst device 2 and $NH_3$ produced from the supplied urea so as to realize a high $NO_X$ purification rate.

For example, immediately before a time (t2), an amount of urea of the equivalence ratio under 1 (for example 0.7) is supplied to restrain the $NH_3$ discharge so that the amount of urea (A) held in the $NO_X$ catalyst device 2 decreases. Therefore, at the time (t2), a difference between the target amount of held urea (At) for the current temperature (T) of the $NO_X$ catalyst device 2 and the current amount of urea (A) held in the $NO_X$ catalyst device 2 becomes larger than the set amount (ΔA).

Accordingly, the first control is carried out from the time (t2) so that an amount of water solution of urea of the equivalence ratio over 1, for example 2 is supplied to the $NO_X$ catalyst device 2 by the urea supplying device 3. Thus, at a time (t3), the amount of held urea (A) reaches the target amount of held urea (At) at the time (t3). Therefore, the second control is carried out from the time (t3) again.

According to such a urea supplying control, during the second control, even if the amount of held urea (A) is larger than the target amount of held urea (At), when a high $NO_X$ purification rate is required, the urea supplying is not stopped and a $NO_X$ purification rate does not drops. In the $NO_X$ catalyst device, $NH_3$ is not produced only from the held urea but is produced also from the urea of the predetermined equivalence ratio supplied to the $NO_X$ catalyst device 2 by the second control so that a high $NO_X$ purification rate can be realized by a sufficient amount of $NH_3$ generally distributed within the $NO_X$ catalyst device 2.

Figure 5:
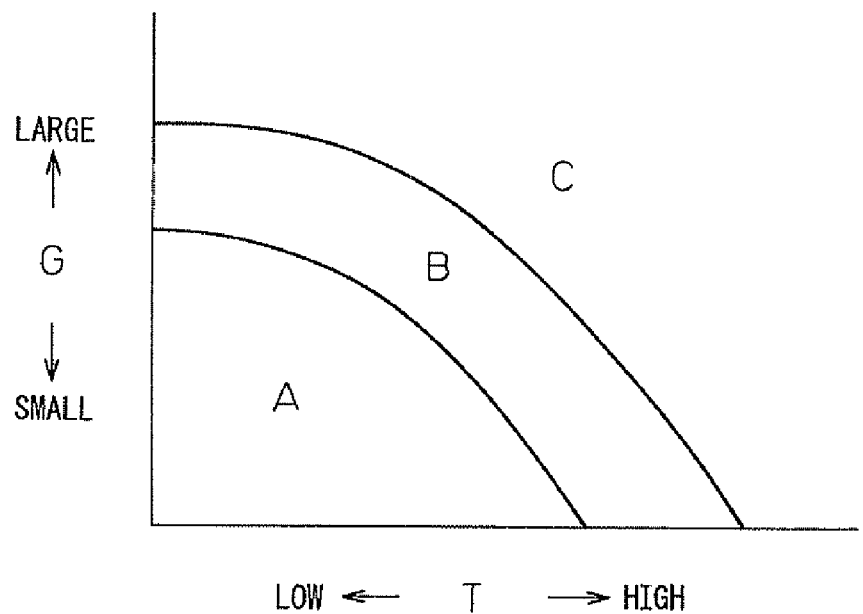
FIG. 5 is a map showing areas divided on the basis of a temperature of the $NO_X$ catalyst device and an amount of exhaust gas.

In the second control, it is preferable that the equivalence ratio in an engine operation area (A) in three areas (A), (B), and (C) divided on the basis of a temperature (T) of the $NO_X$ catalyst device 2 and an amount of exhaust gas (G) per a unit time as shown FIG. 5 is made over 1 to increase the $NO_X$ purification rate because the temperature (T) of the $NO_X$ catalyst device 2 is low and a $NO_X$ reducing ability of the $NO_X$ catalyst device 2 drops. In the area (A), the amount of exhaust gas (G) is small. Therefore, even if $NH_3$ is discharged from the $NO_X$ catalyst device 2, $NH_3$ can be sufficiently oxidized by the oxidation catalyst device 6 so that an amount of $NH_3$ released into the atmosphere can be sufficiently decreased.

In the area (B), the temperature (T) of the $NO_X$ catalyst device 2 is higher than that in the area (A) so that the $NO_X$ reducing ability of the $NO_X$ catalyst device 2 does not drop so much. Therefore, an amount of urea of the equivalence ratio of 1 is supplied.

In the area (C), the temperature (T) of the $NO_X$ catalyst device 2 is high so that the $NO_X$ reducing ability of the $NO_X$ catalyst device 2 is also high. Therefore, an amount of urea of the equivalence ratio under 1 is supplied. Further, in this area, an amount of exhaust gas (G) is large. Therefore, if $NH_3$ flows out from the $NO_X$ catalyst device 2, $NH_3$ can not be sufficiently oxidized by the oxidation catalyst device 6 arranged downstream thereof. Accordingly, an amount of urea of the equivalence ratio under 1 is supplied so that almost $NH_3$ does not flow out from the $NO_X$ catalyst device 2.

Figure 6:
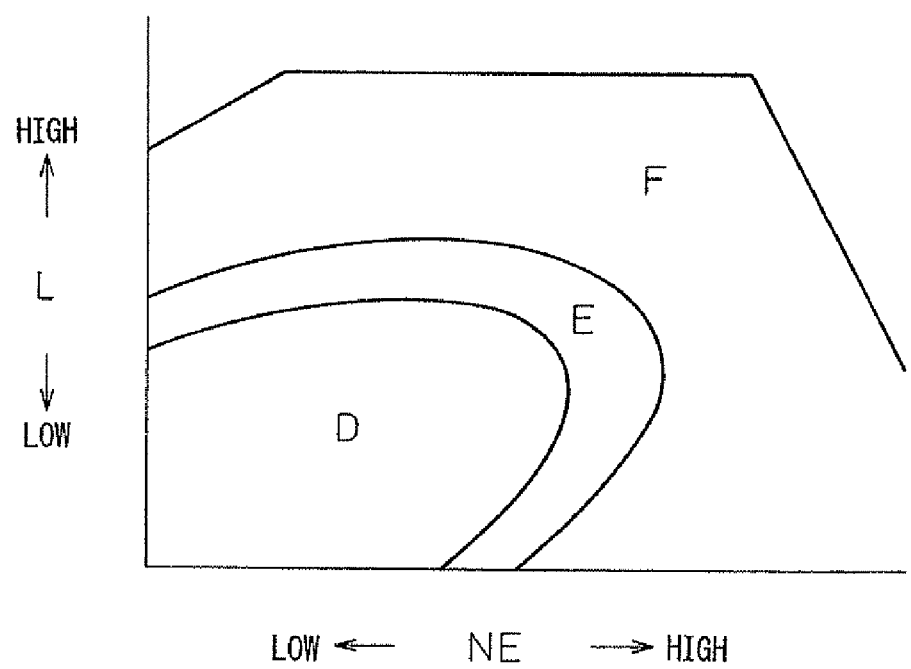
FIG. 6 is a map showing areas divided on the basis of an engine speed and an engine load.

Besides, in the second control, the equivalence ratio in an engine operation area (D) in three areas (D), (E), and (F) divided on the basis of an engine speed (NE) and an engine load (L) as shown FIG. 6 is over 1 to increase the $NO_X$ purification rate because an amount of the exhaust gas is small so that if $NH_3$ flows out from the $NO_X$ catalyst device 2, $NH_3$ can be sufficiently oxidized by the oxidation catalyst device 6 arranged downstream thereof.

In the area (E), an amount of the exhaust gas is larger than that in the area (D) so that it is preferable that $NH_3$ does not flow out from the $NO_X$ catalyst device 2 so much. Therefore, an amount of urea of the equivalence ratio of 1 is supplied.

In the area (F), an amount of the exhaust gas is large so that if $NH_3$ flows out from the $NO_X$ catalyst device 2, $NH_3$ cannot be sufficiently oxidized by the oxidation catalyst device 6 arranged downstream thereof. Accordingly, an amount of urea of the equivalence ratio under 1 is supplied so that almost $NH_3$ does not flow out from the $NO_X$ catalyst device 2.

Thus, in the second control, an amount of urea of the equivalence ratio of a value suitable for the current engine operation is supplied in spite of a relation between the current target amount of held urea and the current amount of held urea. As a result, $NH_3$ may flow out from the $NO_X$ catalyst device 2 so that it is preferable to arrange the oxidation catalyst device 6 downstream of the $NO_X$ catalyst device 2 to oxidize the $NH_3$.

In the present urea supplying control, the first control is carried out when a difference between the target amount of urea (At) for the current temperature of the $NO_X$ catalyst device 2 and the current amount of held urea is larger than the set amount (ΔA). Accordingly, it does not continue that the difference between the target amount of urea (At) for the current temperature of the $NO_X$ catalyst device 2 and the current amount of held urea is larger than the set amount. Therefore, during the second control, $NH_3$ is sufficiently released from the held urea in the $NO_X$ catalyst device and it can be restrained to drop the $NO_X$ purification rate.

For example, in case that a particulate filter is arranged in the exhaust passage, the temperature of the exhaust gas is elevated to burn the particulates trapped on the particulate filter. At present, because the temperature (T) of the $NO_X$ catalyst device 2 is also elevated so that the amount of held urea (A) decreases, a difference between the target amount of urea (At) for the current temperature of the $NO_X$ catalyst device 2 and the current amount of held urea becomes easily larger than the set amount (ΔA).

In the present urea supplying control, the first control may be carried out at every engine starting in spite of the amount of urea held at the engine starting. Therefore, every engine starting time, the target amount of urea is held by the first control so that during the second control, $NH_3$ is sufficiently released from the held urea in the $NO_X$ catalyst device and it can be restrained to drop the $NO_X$ purification rate.

In the above explanations, the reducing material supplied to the $NO_X$ catalyst device 2 is the water solution of urea. However, the reducing material may be fuel which stands for hydrocarbon HC. HC can be also supplied on the basis of the equivalence ratio.

LIST OF REFERENCE NUMERALS

1: exhaust passage
2: $NO_X$ catalyst device
3: urea supplying device
6: oxidation catalyst device

The invention claimed is:
1. An exhaust purification system of an internal combustion engine, comprising:
a $NO_X$ catalyst device which has a reducing material holding ability for holding reducing material and can reduce $NO_X$ by using the reducing material; and
an electronic control unit that includes program logic, which when executed:
determines whether or not a difference between a target amount of reducing material held by the $NO_X$ catalyst device and a current amount of reducing material held by the $NO_X$ catalyst devise is larger than a set amount;
performs a first control, in which an amount of the reducing material of an equivalence ratio over 1 for an amount of $NO_X$ in the exhaust gas flowing into said $NO_X$ catalyst device is supplied to said $NO_X$ catalyst device when the difference is larger than the set amount until said $NO_X$ catalyst device holds a preset target amount of the reducing material; and performs a second control in which the amount of the reducing material of the equivalence ratio of a predetermined value for the amount of $NO_X$ in the exhaust gas flowing into said $NO_X$ catalyst device is supplied to said $NO_X$ catalyst device when the difference is less than or equal to the set amount, wherein, when the second control is performed, the amount of the reducing material of the equivalence ratio over 1 for the amount of $NO_X$ in the exhaust gas flowing into said $NO_X$ catalyst device is supplied to said $NO_X$ catalyst device when a high $NO_X$ purification rate is required even if the current amount of reducing material held by the $NO_X$ catalyst device is larger than the target amount of reducing material held by the $NO_X$ catalyst device.

2. An exhaust purification system of an internal combustion engine as set forth in claim 1 wherein said predetermined value in the second control is predetermined for each engine operation.

3. An exhaust purification system of an internal combustion engine as set forth in claim 1 wherein said target amount of reducing material in said first control is preset for each temperature of said $NO_X$ catalyst device.

4. An exhaust purification system of an internal combustion engine as set forth in claim 1 wherein said first control is carried out every engine starting time.

5. An exhaust purification system of an internal combustion engine as set forth in claim 2 wherein said target amount of reducing material in said first control is preset for each temperature of said $NO_X$ catalyst device.

6. An exhaust purification system of an internal combustion engine as set forth in claim 2 wherein said first control is carried out every engine starting time.

7. An exhaust purification system of an internal combustion engine as set forth in claim 3 wherein said first control is carried out every engine starting time.

8. An exhaust purification system of an internal combustion engine as set forth in claim 5 wherein said first control is carried out every engine starting time.

* * * * *